Aug. 18, 1953  W. P. MURPHY, JR  2,649,299
SPRING SCALE
Filed March 14, 1951
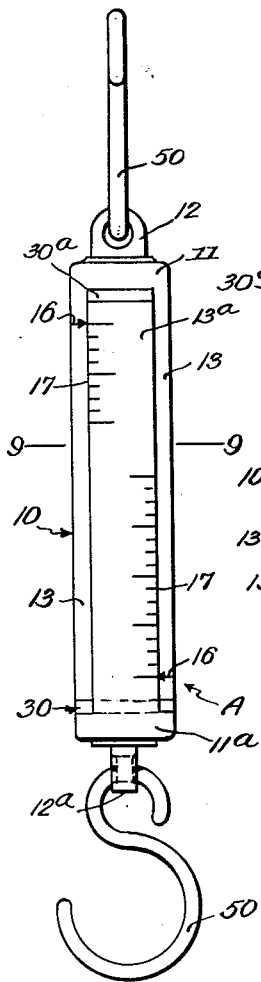
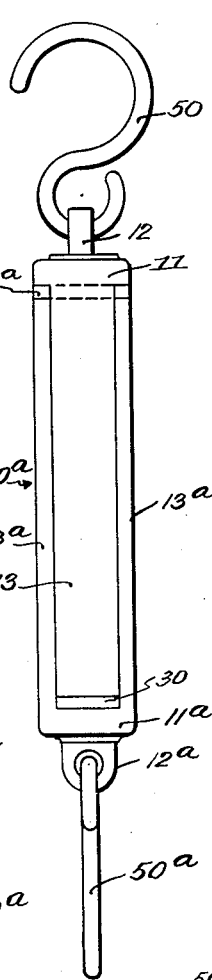
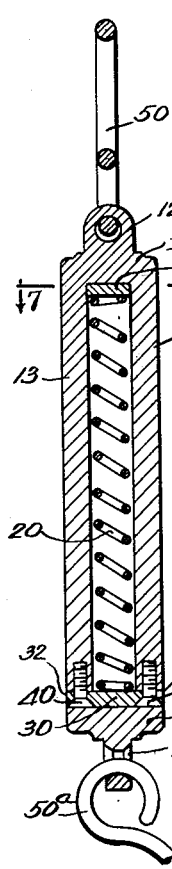
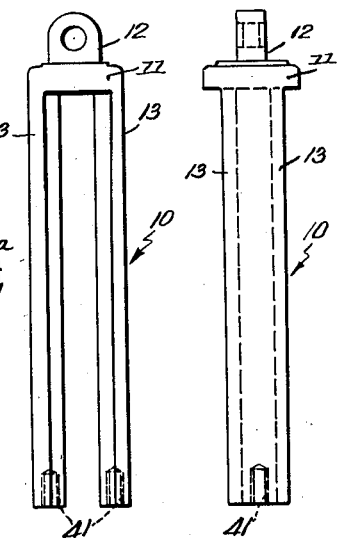
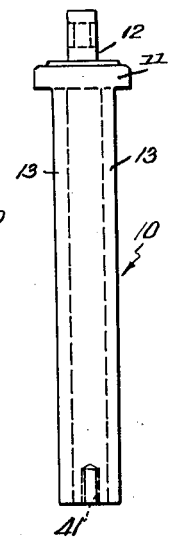
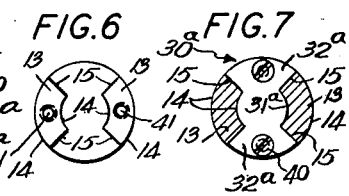
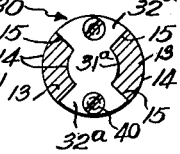
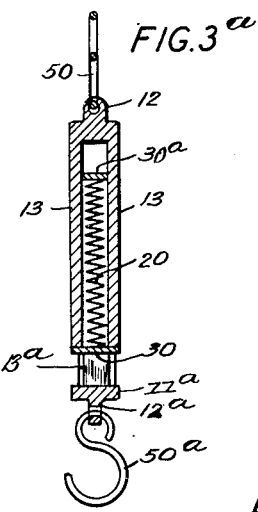
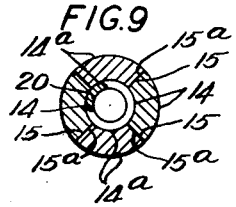
INVENTOR
William P. Murphy Jr.
BY Emery, Booth, Townsend, Miller & Widner
ATT'YS Patented Aug. 18, 1953

2,649,299

UNITED STATES PATENT OFFICE 2,649,299

SPRING SCALE

William P. Murphy, Jr., Brookline, Mass., assignor to Fenwal Laboratories, Inc., Ashland, Mass., a corporation of Massachusetts Application March 14, 1951, Serial No. 215,449

4 Claims. (Cl. 265—63)

My present invention relates generally to portable weighing devices and more particularly to improvements in the construction and operation of gravimetric spring scales.

Important among the objects of the invention is the minimizing of the number of parts required for construction of a spring scale, as by a unique application of symmetry of design, and whereby the scale is distinguished by ease and economy of manufacture as well as durability and accuracy in use. Additionally characterizing the scale of the invention is a unique interfitting of the parts rendering it compact, light-weight and easily assembled, and through which the spring is completely shielded under all conditions of use. My novel scale will be seen further to embody certain other structural features and operative characteristics whence it is neat and attractive in appearance and smooth and steady in operation.

The nature and characteristic features of my invention will be better understood from the following description taken in conjunction with the accompanying drawings which illustrate by way of example a preferred embodiment, and in which:

Fig. 1 is an elevational view of a spring scale according to the invention;

Fig. 2 is a similar view taken at right angles to that of Fig. 1;

Fig. 3 is a vertical section of the scale;

Fig. 3a is a reduced section like that of Fig. 3, showing the scale members in an extended position as in use;

Figs. 4 and 5 are views corresponding to Figs. 1 and 2 of one of the pair of U-shaped bars forming the body of the scale;

Fig. 6 is an end view looking at the free ends of the arms of a bar as in Fig. 4;

Fig. 7 is a section along the line 7—7 of Fig. 3, illustrating in section the arm ends of Fig. 4 and in top plan the bearing plate interfitted therewith;

Fig. 8 is a side view of the plate of Fig. 7; and

Fig. 9 is a section along the line 9—9 of Fig. 1.

It is here noted that on the drawing corresponding parts of the duplicate main elements or parti-cylindrical U-bars are given the same numerals, with the addition of the letter exponent $a$ for one of them, and that duplicate sub parts of the main elements have the same numbers.

The new and improved gravimetric spring scale of the present invention will seem to be characterized chiefly and generally by a complete symmetry or more particularly identity of design and construction of its opposite ends. In other words, the scale is formed with duplicate ends, rather than a differentiated or distinguishable top and bottom; that is, it is provided at any or each end with elements or members finding their identical counterpart in the other or opposite end. The several advantages resulting from this and divers related improvements hereinafter to be mentioned will fully and clearly appear as the description proceeds.

Referring now more particularly to the drawings, my novel scale comprises generally a tubular, cylindrical body or casing A constituted by identically formed, mutually interfitted forked or U-shaped members or bars 10, 10a having annular bridge or shoulder portions 11, 11a mounting integrally or otherwise coupler-engaging rings or eye members 12, 12a. Bars 10, 10a further comprise elongated, aligned arms 13, 13 and 13a, 13a extending normally from said shoulders 11, 11a. As clearly shown in Figs. 6, 7 and 9, arms 13, 13a have arcuate inner and outer walls 14, 14 and 14a, 14a of quarter circular extent, and are guided for desired sliding relationship along opposed radial or bevel edge surfaces 15, 15 and 15a, 15a providing substantial bearing areas. Further emphasizing the symmetry of design above mentioned, the slidably interfitted arms 13, 13a of the bars 10, 10a together aggregate a complete cylindrical casing as if fashioned from a single or unitary tube or cylinder, wherein each U-bar presents a pair of diametrally opposed arcuate quarter sections or quadrants, all identical, the two arms of each U-bar together making up one-half the circumference.

In further accordance with the invention there is provided a coil spring 20 which is mounted for desired weight sensing flexure within the central casing. One important advantage flowing from the unique symmetry and interfitting of the bars 10, 10a and associated parts later to be mentioned is here noted as the complete shielding and mechanical protection afforded spring 20 in both the compact, non-use position of Figs. 1 to 3 and the extended or operative position of Fig. 3a. Such spring sealing construction and arrangement of the interfitted casing elements will more fully appear as the description proceeds.

I have found it advantageous in several respects to construct and arrange the relatively slidable casing halves for compression rather than tension of spring 20. As mounted for compression, spring 20 is seen to be free of the bothersome hook type ends required of a tension spring, and is adapted also to a desired shorter scale or range of action. Accordingly I provide U-closing bearing plates 30, 30a for confining and compressing spring 20 upon aligned relative sliding movement of bars 10, 10a. Identical plates 30, 30a are formed centrally with rounded hub portions 31, 31a sized to telescope snugly within the fork arms 13, 13a, and peripherally with oppositely extending wing portions 32, 32a which are sectioned exactly conformant to arms 13, 13a. Wings 32, 32a thus are similarly quarter sections of a tube or cylinder, and as will be apparent from a consideration of Figs. 6 and 7 in connection with Figs. 1 to 3, serve in interfitted relationship with the fork arms to complete sections of the spring sealing casing 10, 10a. Plates 30, 30a are fastened in U-closing manner to the free ends of arms 13, 13a as by flush fitted screw or stud means 40 threaded or otherwise fixed in recesses 41. As hereinbefore stated the fork arms 13, 13a and bearing plates 30, 30a completely and sealingly enclose the spring 20 when fully telescoped or compacted as in Figs. 1 and 2. It will be understood from the foregoing that by reason of the described interfitted U-closing arrangement of the bearing plates 30, 30a desired shielding and mechanical protection of the spring is afforded also when the casing elements are in the extended or use position illustrated in Fig. 3a.

Further exemplifying the symmetry of design and uniformity of corresponding parts novelly applied in my spring scale is the provision of identical support and weight engaging members or couplers 50, 50a. These may be variously attached, preferably movable, to the respective scale halves, as by passing them loosely through the eyes 12, 12a projecting oppositely from the bars 10, 10a, as already described, with the coupler end closed on itself sufficiently to prevent escape from the eye. The couplers 50, 50a may have any desired or preferred shape or configuration, as for example the hook form illustrated in Figs. 1 to 3.

The unique, double-ended character of my spring scale will be seen also to permit identical scale indicia at the opposite ends of the central casing, as indicated in Fig. 1. The reference index or pointer 16 may be placed on the arms of one or both of the bars 10, 10a, and the indicia 17 opposed thereto may extend axially in one or both directions, the latter arrangement, as shown, facilitating reading either end up.

In the assembly and operation of the device, one of the cover plates, for example plate 30, the associated securing means 40, and spring 20 are first loosely assembled in one of the bars, in this case bar 10a. The other plate 30a is then fixed to the ends of the arms of the bar 10a, confining the spring 20. The assembly of the casing is readily completed by passing the arms of the other bar 10 over the exposed plate 30a and between the arms of the one bar 10a and then compressing spring 20 and loosely mounted plate 30 sufficient to allow access to said associated securing means 40 for fastening plate 30 to said other bar 10. Lastly, the couplers 50, 50a are attached to eyes 12, 12a.

It will be understood that my novel portable spring scale is adapted for many and diversified uses. The present invention, therefore, contemplates constructional embodiments of the scale which vary widely in size and proportioning of the parts and in the nature of the materials used therefor. It will be understood, however, that irrespective of the preferred or intended use, in the operation of the scale either of the couplers 50, 50a may be attached to or suspended from a suitable support, or employed for engaging the weight or mass to be measured; and indices may be provided whereby the indicated value may be read or determined with either end of the device up, as hereinbefore mentioned, with reading point at either top or bottom or both as may be preferred. It is herein again pointed out that the described novel construction and arrangement of the parts prevents interference with or injury to the spring 20, and minimizes friction at the bearing surfaces 16, 16a, as well as providing ample guiding and precluding misalignment of the relatively sliding bars 10, 10a, even in maximum extended position. Interference, friction and misalignment as above referred to have heretofore been sources of inaccuracy or error in this class of device.

The numerous advantages and improvements flowing from the perfect symmetry or identity end to end by which the present invention is uniquely characterized cannot be over emphasized. The number of parts required for the scale is of course halved or substantially so, and tooling costs and the number of parts required to be stocked in the production of the device are similarly reduced. Additionally the scale is easily assembled and disassembled, of compact design and light weight, and of low cost to manufacture, yet rugged and efficient in use. My novel spring scale is seen further to be of clean design and pleasing in appearance, and to be ideally suited to displaying the scale marking, and even to the use of a vernier arrangement of indices. It will be understood therefore that the scale while ideally adapted to easy and inexpensive manufacture, is in every way a precision instrument, maintaining a high degree of accuracy under use conditions.

My invention is not limited to the particular embodiment thereof illustrated and described herein, and I set forth its scope in my following claims.

I claim:

1. A weighing device comprising, in combination, a sectioned, elongated casing formed by duplicate, opposed, lengthwise slidably interfitted bars having each a shoulder portion and normally depending arms and aligned and guided for relative axial movement by mating longitudinal bearing surfaces on said arms, said bars mutually shaped and arranged to define a longitudinal chamber centrally of the casing; duplicate bearing plates capping the opposite open ends and underlying the shoulders of said interfitted bars to define end walls for said chamber; spring means compressively interposed in said chamber between said plates; oppositely extending coupler means on said bars for engaging respectively and alternatively a support and the load to be weighed; and scale indicia on said casing.

2. A spring scale comprising a longitudinally sectioned tubular casing formed by identical opposed bar pairs each closed by cross connection at one end and slidably interfitted at the opposite initially open ends thereof, said bars having longitudinally thereof mating radial edge bearing surfaces; identical plates bridging said interfitted open ends and providing casing sealing end walls relatively movable with and oppositely of said bars; spring means compressively interposed in said casing between said end walls; and identical support and weight engageable coupling elements oppositely projecting from the closed ends of the bar pairs.

3. A new and improved spring scale comprising, in combination, a tubular casing defined by a pair of identical, opposed, slidably interfitted forked members, said members having each a shoulder portion and depending normally therefrom aligned arms forming each a tube fragment having radial edge bearing surfaces longitudinally thereof; duplicate bearing plates bridging the free ends of the arms and including a central body shaped and sized snugly to telescope within said arms, and peripherally thereof oppositely extending wing portions dimensioned exactly as the arms, said wing portions interfitting and complementing the arms normally to complete a section of the casing adjacent each of said shoulders; a coil spring compressively interposed in said casing between said plates; duplicate support engaging means oppositely extending from said member shoulders, and scale providing indicia on said elements.

4. The structure of claim 3, wherein both said forked member shoulders include identically formed, integrally and axially projecting ring portions, and said support engaging means comprise hooks swingable in said rings.

WILLIAM P. MURPHY, Jr.

References Cited in the file of this patent

UNITED STATES PATENTS

| Number | Name | Date |
|---|---|---|
| 629,290 | Goodbaudy | July 18, 1899 |

FOREIGN PATENTS

| Number | Country | Date |
|---|---|---|
| 14,963 | Great Britain | Aug. 3, 1894 |
| 25,551 | Great Britain | Nov. 5, 1908 |